United States Patent [19]
Koopman, Jr.

[11] Patent Number: 5,975,622
[45] Date of Patent: Nov. 2, 1999

[54] WIRELESS AUTOMOTIVE DOOR

[75] Inventor: Philip J. Koopman, Jr., Pittsburgh, Pa.

[73] Assignee: Lear Automotive Dearborn, Inc., Southfield, Mich.

[21] Appl. No.: 08/955,014

[22] Filed: Oct. 20, 1997

[51] Int. Cl.[6] ............................................. B60J 1/08
[52] U.S. Cl. ................................ 296/146.1; 296/146.5
[58] Field of Search .......................... 296/146.1, 146.5

[56] References Cited

U.S. PATENT DOCUMENTS 5,584,144  12/1996  Hisano .............................. 296/146.5
5,588,260  12/1996  Suzuki et al. ..................... 296/146.5

*Primary Examiner*—Gary C. Hoge
*Attorney, Agent, or Firm*—Brooks & Kushman P.C.

[57] ABSTRACT

A wireless vehicle door assembly includes a conductive layer sandwiched between two nonconductive layers. An input terminal provides a connection between the conductive layer and a plurality of wires from another portion of the vehicle. A plurality of connectors couple a plurality of loads to the conductive layer. Electrical power and signals are propagated along the conductive layer to control the various loads.

20 Claims, 2 Drawing Sheets

WIRELESS AUTOMOTIVE DOOR

BACKGROUND OF THE INVENTION

This invention generally relates to a wireless system for conducting electrical energy and signals to a plurality of loads that are supported on a vehicle door.

Modem day vehicles include a large number of electrical components. A major challenge associated with these components is providing wiring supported on the vehicle body to supply the appropriate power and electrical control signals to the various electrical components. For example, vehicle doors typically support power door locks and a power window motor for raising and lowering the window. It is necessary to supply power to such loads. The conventional approach is to utilize a wire harness through the front portion of the vehicle body that protrudes into the door frame near the hinge connecting the door frame to the vehicle body. A new set of wires then connects the electrical loads to the wires within the wire harness coming into the door frame. Where a large number of components or relatively complex wiring arrangement is required, separate wire harnesses have been used within the door.

There are disadvantages to existing systems in that a large number of wire harnesses may have to be designed to accommodate the varying shapes and content of different vehicles. Moreover, as more electrical loads are introduced, the number of wires increases and the cost and complexity of this system grows.

This invention provides a wireless arrangement for supplying power and communicating electrical signals to a plurality of loads supported on a vehicle door.

SUMMARY OF THE INVENTION

In general terms, this invention is a vehicle door assembly that provides wireless communication of electrical power and electrical signals to a plurality of loads supported on the door. The invention includes several basic elements. A vehicle door frame supports first and second non-conductive layers. A conductive layer is disposed between the first and second non-conductive layers. The conductive layer has an input terminal that is adapted to be connected to a source of electrical power, which would be located on another portion of the vehicle. At least one connector is provided for connecting the conductive layer to a load so that electrical power from the power source can be communicated to the load as needed.

In the preferred embodiment, the conductive layer is made from a single sheet of material. This single sheet of material can be a flat piece of metal, for example, or a conductive mesh material.

The preferred embodiment of the connector includes a penetrating member that penetrates through the conductive layer. An end portion of the penetrating member remains adjacent to and in contact with the conductive layer. Most preferably, a plurality of projections are provided on the end portion to provide a more secure and better conducting connection between the penetrating member and the conductive layer.

The various features and advantages of this invention will become apparent from the following detailed description of the preferred embodiment. The drawings that accompany the detailed description can be briefly described as follows.

DETAILED DESCRIPTION OF THE PREFERRED EMBODIMENT

Figure 1:
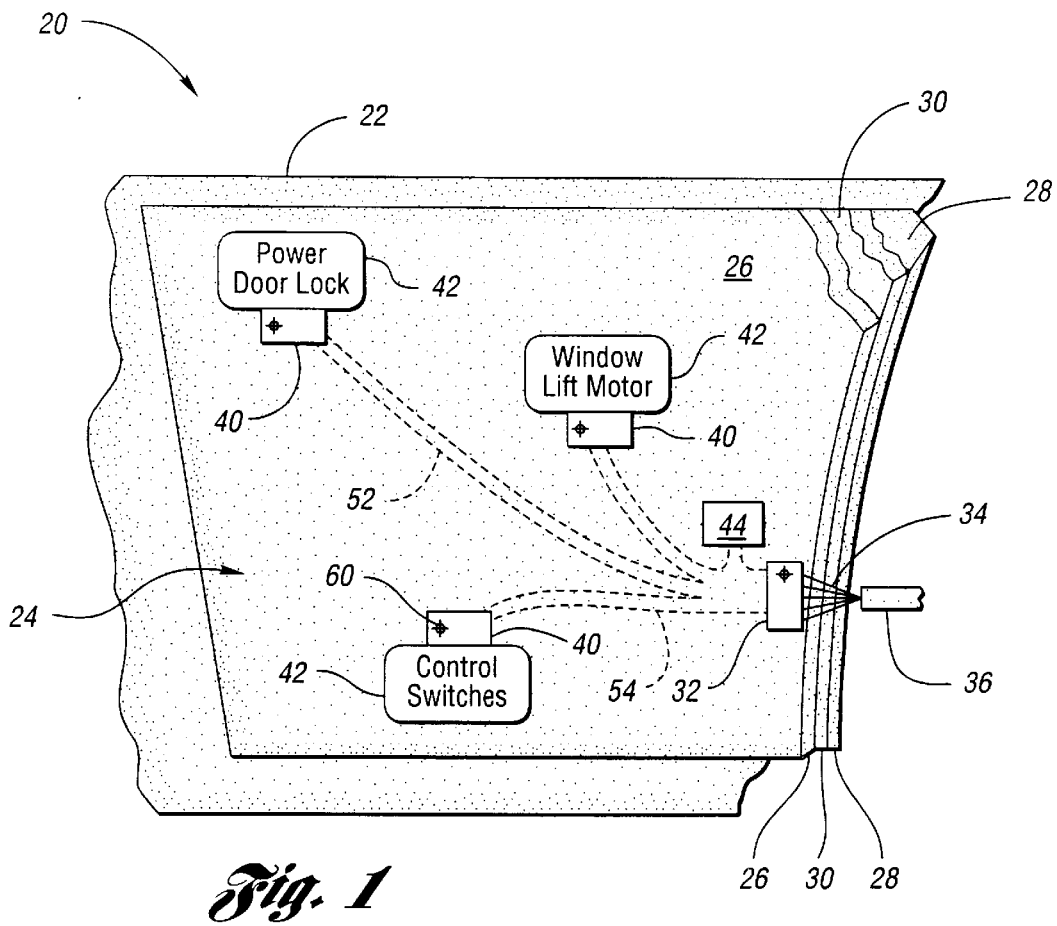
FIG. 1 is a schematic illustration of an assembly designed according to this invention.

FIG. 1 illustrates a vehicle door assembly 20 including a door frame 22 that is illustrated schematically. A sandwich of layers 24 are supported on the door frame 22 in a conventional manner. The sandwich of layers 24 includes a first non-conductive layer 26 and a second non-conductive layer 28. The non-conductive layers can be conventional vapor barriers or noise barriers, or combinations of the two, respectively.

Figure 3:
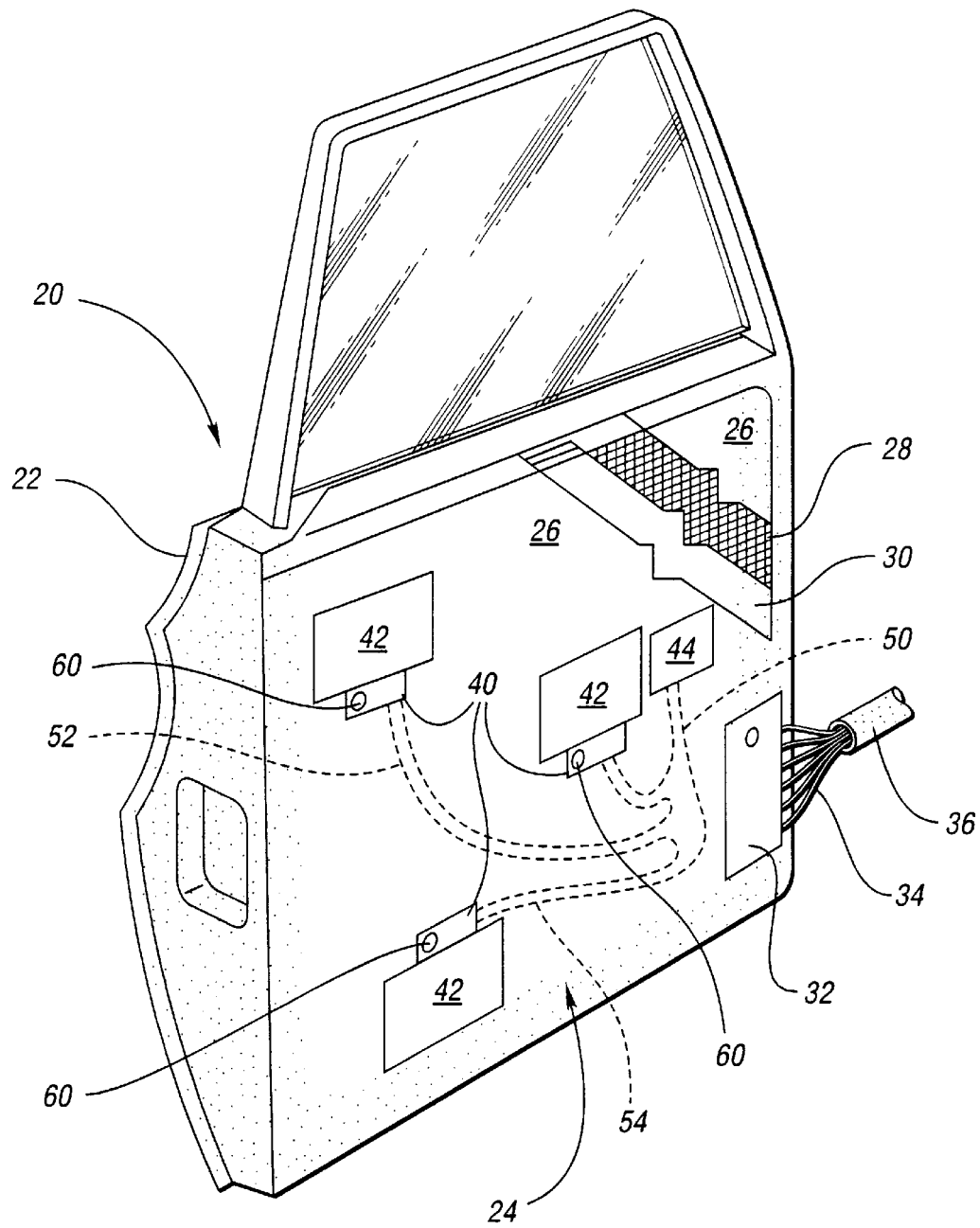
FIG. 3 shows an alternative embodiment to that illustrated in FIG. 1.

A conductive layer 30 is disposed between the first and second nonconductive layers 26 and 28. The conductive layer 30 preferably is a generally continuous sheet of conductive material. In one embodiment, a generally flat sheet of metal is used. In another example embodiment shown in FIG. 3, a conductive wire mesh material is used as the conductive layer 30.

The conductive layer 30 includes an input terminal 32. A plurality of wires 34 that are supported in a conventional wire harness 36 protrude into the door frame 22 and are coupled with the conductive layer 30 through the input terminal 32. The wires 34 provide the electrical power to the various loads supported on the door frame 22. The term electrical power is used in this specification generically to include power per se and electrical signals that are useful to control the operation of a load.

A plurality of connectors 40 are coupled to the conductive layer 30. The connectors 40 provide a connection between the conductive layer 30 and a plurality of loads 42. Example loads include power door locks and a window lift motor.

A return ground path is provided, for example, by a connection between the loads 42 and the door frame 22.

The transfer of electrical signals or data among the various loads 42 preferably is accomplished by a wireless multiplexing system schematically shown at 44. In the preferred embodiment, infrared technology is utilized. Alternatively, radio frequency signals can be used. Since multiplexing technology is preferably employed, the loads 42 or the connectors 40 preferably include multiplexed transceivers that are adapted to handle the signals. Since a variety of loads 42 and a variety signals will likely be employed, signal guides or channels preferably are provided in a plastic molded portion of the door to enhance signal communication and to ensure that signals are not obstructed. In the illustration of FIG. 1, the non-conductive layer 26 includes signal guide passages 50, 52 and 54 (illustrated in phantom).

Figure 2:
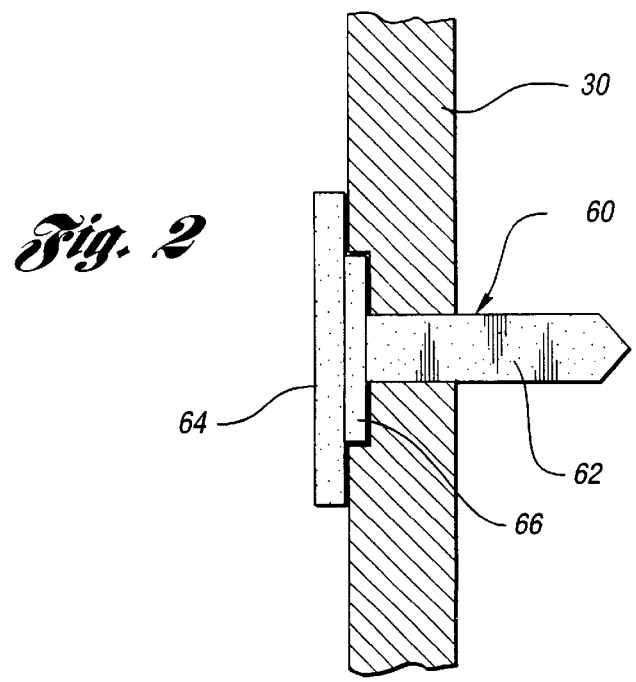
FIG. 2 is a diagrammatic, partially cross-sectional illustration of a portion of a connector designed according to this invention.

FIG. 2 illustrates a portion of the connector 40. Each connector 40 preferably includes a penetrating member 60 that penetrates through the conductive layer 30. In the embodiment of FIG. 1, the penetrating members 60 penetrate through the non-conductive layers and the conductive layer 30. As shown in FIG. 2, the penetrating member 60 preferably includes a penetrating portion 62, which preferably penetrates completely through the conductive layer 30. An end portion 64 lies adjacent to and engages the conductive layer 30. The end portion 64 preferably includes a plurality of projections 66 that project against and preferably into the conductive layer 30. The projections 66 could pierce through a portion of the conductive layer 30 or slightly deform the material of the conductive layer immediately adjacent the projections 66. The projections 66 can be in the form of splines, tabs or small spikes, for example.

The input terminal 32 preferably includes a similar penetrating member 60 to provide the necessary coupling with the conductive layer 30.

Given this description, those skilled in the art will be able to choose from among appropriate conductive materials to realize the conductive layer 30. Similarly, given this description, those skilled in the art will be able to choose from among commercially available multiplexing components or develop appropriate software to realize the communication of power along the conductive layer 30 and control signals to the various loads 42.

The preceding description is exemplary rather than limiting in nature. Variations and modifications to the disclosed embodiment may become apparent to those skilled in the art that do not necessarily depart from the purview and spirit of this invention. The legal scope of protection is limited only by the following claims.

What is claimed is:

1. A vehicle door assembly, comprising:

a door frame;

first and second nonconductive layers supported by said door frame;

a conductive layer disposed between said first and second nonconductive layers, said conductive layer having an input terminal adapted to be connected to a source of electric power; and at least one connector adapted to be connected to said conductive layer for coupling a load to said conductive layer so that electric power from the source can be provided to the load.

2. The assembly of claim 1, wherein said conductive layer comprises a generally continuous, flat sheet of conductive material.

3. The assembly of claim 1, wherein said conductive layer comprises a piece of mesh material.

4. The assembly of claim 1, wherein said connector includes a penetrating portion that penetrates through said conductive layer and an end portion that is positioned adjacent and in contact with said conductive layer when said penetrating portion penetrates said conductive layer.

5. The assembly of claim 4, wherein said connector end portion includes a plurality of projections that partially deform and project into said conductive layer when the end portion is positioned in contact with said conductive layer.

6. The assembly of claim 4, wherein said penetrating portion penetrates through at least one of said nonconductive layers.

7. The assembly of claim 1, wherein said conductive layer input terminal includes a penetrating portion that penetrates through said conductive layer and an end portion that is positioned adjacent to and in contact with said conductive layer when said penetrating portion penetrates said conductive layer, said connector end portion including a plurality of projections that partially deform and project into said conductive layer when the end portion is positioned in contact with said conductive layer.

8. The assembly of claim 1, wherein said first and second nonconductive layers respectively comprise one or more of the group consisting of a vapor barrier and a noise barrier.

9. The assembly of claim 1, further comprising a wireless multiplexing system that conducts a plurality of electrical signals and said connector includes a multiplexed transceiver.

10. The assembly of claim 9, further comprising a plastic molded portion having signal pathways formed to guide said signals to said connector.

11. The assembly of claim 1, further comprising a grounding path for said assembly through a portion of the load that is coupled to said door frame.

12. A vehicle door assembly, comprising:

a door frame;

a plurality of electrically driven loads supported on said door frame;

a first nonconductive layer supported within said door frame;

a second nonconductive layer supported within said door frame;

a conductive layer disposed between said first and second nonconductive layers, said conductive layer having an input terminal;

a plurality of connectors that connect said plurality of loads to said conductive layer; and a multiplexing device that provides a plurality of electrical signals to control said loads.

13. The assembly of claim 12, wherein said plurality of loads are powered by a source of electrical power that is coupled to said input terminal so that said power is propagated along said conductive layer.

14. The assembly of claim 12, wherein said conductive layer comprises a generally continuous, generally flat piece of conductive material.

15. The assembly of claim 12, wherein said conductive layer comprises a mesh material.

16. The assembly of claim 12, wherein each said connector includes a penetrating portion that penetrates through said conductive layer and an end portion that is positioned adjacent and in contact with said conductive layer when said penetrating portion penetrates said conductive layer.

17. The assembly of claim 16, wherein each said connector end portion includes a plurality of projections that partially deform and project into said conductive layer when the end portion is positioned in contact with said conductive layer.

18. A method of supplying power along a conductive sheet to a plurality of electrical loads that are supported on a vehicle door, comprising the steps of:

(A) coupling the loads to the conductive sheet;

(B) coupling a power source to the conductive sheet; and (C) generating power using the power source so that the power is conducted along the conductive sheet and communicated to the loads.

19. The method of claim 18, further comprising the step of disposing the conductive sheet between two nonconductive layers.

20. The method of claim 18, further comprising the step of supplying electrical signals to the loads using a wireless multiplexing system.

* * * * *